(12) United States Patent  
Poston et al.

(10) Patent No.: US 8,610,743 B2  
(45) Date of Patent: Dec. 17, 2013

(54) SYSTEMS AND METHODS FOR DISPLAYING, VIEWING AND NAVIGATING THREE DIMENSIONAL REPRESENTATIONS

(75) Inventors: Ricky Poston, Austin, TX (US); Michael Cooper, Houston, TX (US); Ting He, Austin, TX (US); Scott Sellers, Austin, TX (US)

(73) Assignee: BMC Software, Inc., Houston, TX (US)

( * ) Notice: Subject to any disclaimer, the term of this patent is extended or adjusted under 35 U.S.C. 154(b) by 196 days.

(21) Appl. No.: 13/174,358

(22) Filed: Jun. 30, 2011

(65) Prior Publication Data

US 2013/0002668 A1      Jan. 3, 2013

(51) Int. Cl.  
*G09G 5/00* (2006.01)

(52) U.S. Cl.  
USPC ............ 345/660; 345/441; 715/848; 715/854

(58) Field of Classification Search  
USPC .......... 345/660, 663, 419, 619; 715/850, 848, 715/853, 854  
See application file for complete search history.

(56) References Cited

U.S. PATENT DOCUMENTS

| | | | |
|---|---|---|---|
| 5,619,632 A * | 4/1997 | Lamping et al. ............... | 345/441 |
| 5,929,864 A | 7/1999 | Picott et al. | |
| 6,182,249 B1 | 1/2001 | Wookey et al. | |
| 6,356,285 B1 | 3/2002 | Burkwald et al. | |
| 6,425,006 B1 | 7/2002 | Chari et al. | |
| 6,590,587 B1 | 7/2003 | Wichelman et al. | |
| 6,639,614 B1 | 10/2003 | Kosslyn et al. | |
| 7,379,061 B2 | 5/2008 | Castonguay et al. | |
| 8,416,266 B2 * | 4/2013 | Shoemaker et al. ........... | 345/663 |
| 2003/0020733 A1 * | 1/2003 | Yin ............................... | 345/660 |
| 2003/0033402 A1 * | 2/2003 | Battat et al. ................... | 709/224 |
| 2004/0252128 A1 | 12/2004 | Hao et al. | |
| 2005/0108643 A1 * | 5/2005 | Schybergson et al. ........ | 715/850 |
| 2005/0273730 A1 | 12/2005 | Card et al. | |
| 2007/0211056 A1 | 9/2007 | Chakraborty et al. | |
| 2008/0010605 A1 * | 1/2008 | Frank ............................. | 715/765 |
| 2009/0217099 A1 | 8/2009 | Kato | |
| 2009/0295826 A1 * | 12/2009 | Good et al. ................... | 345/619 |
| 2010/0106752 A1 * | 4/2010 | Eckardt et al. ................ | 715/854 |
| 2011/0148880 A1 | 6/2011 | De Peuter | |
| 2011/0234595 A1 | 9/2011 | Poston | |
| 2011/0316856 A1 | 12/2011 | Poston et al. | |
| 2012/0036484 A1 | 2/2012 | Zhang et al. | |
| 2012/0053986 A1 | 3/2012 | Cardno et al. | |
| 2013/0002723 A1 | 1/2013 | Poston et al. | |

OTHER PUBLICATIONS

Martin, Wattenberg, "Visual Exploration of Multivariate Graphs", Proceedings of ACM CHI 2006 Conference on Human Factors in Computing Systems, ACM Press, 2006, pp. 811-819.

* cited by examiner

*Primary Examiner* — Chante Harrison  
(74) *Attorney, Agent, or Firm* — Brake Hughes Bellermann LLP (57) ABSTRACT

A computer program product is tangibly embodied on a computer-readable medium and includes executable code that, when executed, is configured to cause a data processing apparatus to display multiple objects in a three dimensional (3D) representation, where the multiple objects are visual representations of real objects, and display a subset of the objects and associated metadata in a shaped lens that is movable within the 3D representation in all three axes, where the subset of the objects displayed within the shaped lens are sized larger than the objects outside of the shaped lens.

21 Claims, 6 Drawing Sheets

SYSTEMS AND METHODS FOR DISPLAYING, VIEWING AND NAVIGATING THREE DIMENSIONAL REPRESENTATIONS

TECHNICAL FIELD

This description relates to systems and methods for displaying, viewing and navigating three dimensional representations.

BACKGROUND

Three dimensional (3D) representations of data can be very large and difficult to navigate and to view. For example, 3D graph models that show thousands of nodes may be difficult to navigate and to view.

In certain scenarios, for example, many companies may use a service model approach as part of their information technology (IT) infrastructure. 3D graph models may be used to monitor the service model relationships. These graphs may be extremely complex. The graphs may show thousands of objects and relationships. With such a large number of objects, it may be difficult to monitor the status of the objects. Additionally, due to the large number of objects, many objects in the Z-axis may be obscured by the objects that are closer on the Z-axis. Given the potentially large number of objects, obscured objects and large amount of object data, this can create a graph view that is very complex or even too complex to mentally process. It may be desirable to provide systems and methods to improve the display and the navigation of the objects in the graph.

SUMMARY

According to one general aspect, a computer program product is tangibly embodied on a computer-readable medium and includes executable code that, when executed, is configured to cause a data processing apparatus to display multiple objects in a three dimensional (3D) representation, where the multiple objects are visual representations of real objects, and display a subset of the objects and associated metadata in a shaped lens that is movable within the 3D representation in all three axes, where the subset of the objects displayed within the shaped lens are sized larger than the objects outside of the shaped lens.

Implementations may include one or more of the following features. For example, one or more of the objects outside of the shaped lens may be translucent. A size of the shaped lens may be configurable. A shape of the shaped lens may be configurable. The 3D representation may include a 3D graph model and the shaped lens may be a spherical-shaped lens that is movable and rotatable within the 3D graph model.

In one exemplary implementation, the computer program product may include executable code that, when executed, is configured to cause the data processing apparatus to filter the subset of objects displayed in the shaped lens such that only objects having designated criteria are displayed in the shaped lens.

In another exemplary implementation, the computer program product may include executable code that, when executed, is configured to cause the data processing apparatus to display a second subset of the objects and associated metadata in a second shaped lens that is movable within the 3D representation in all three axes, where the second subset of the objects displayed within the second shaped lens are sized larger than the objects outside of the shaped lens.

In another general aspect, a computer-implemented method executes instructions stored on a computer-readable medium and the method includes displaying multiple objects in a three dimensional (3D) representation, where the multiple objects are visual representations of real objects, and displaying a subset of the objects and associated metadata in a shaped lens that is movable within the 3D representation in all three axes, where the subset of the objects displayed within the shaped lens are sized larger than the objects outside of the shaped lens.

Implementations may include one or more of the features described above and below.

In another general aspect, an apparatus includes instructions stored on a computer-readable storage medium that are executable by at least one processor. The apparatus includes a rendering engine that is configured to cause the at least one processor to display multiple objects in a three dimensional (3D) representation, where the multiple objects are visual representations of real objects, and display a subset of the objects and associated metadata in a shaped lens that is movable within the 3D representation in all three axes, where the subset of the objects displayed within the shaped lens are sized larger than the objects outside of the shaped lens.

Implementations may include one or more of the features described above and below.

The details of one or more implementations are set forth in the accompanying drawings and the description below. Other features will be apparent from the description and drawings, and from the claims.

DETAILED DESCRIPTION

This document describes systems and techniques for displaying, viewing and navigating three dimensional (3D) representations. In one exemplary implementation, the system and techniques enable the display of a very large number of objects in a 3D representation. The objects may be visual representations of data and/or real objects. Throughout this document, the visual representation of real objects means the visual representation of physical objects and/or the visual representation of virtual objects or logical objects including, without limitation, the visual representation of data including any flat set of data. Physical objects may include, without limitation, components in a network such as, for example, components in an information technology (IT) infrastructure. Components in an IT infrastructure may include servers, database servers, web servers, application servers, network hubs, routers, switches and other components.

The multiple objects in the 3D representation may be dynamically sized and spaced relative to one another to provide an indication of the relationship and/or relative importance of an object. The multiple objects also may be sized such that most or all of the objects may be displayed in a single view. In this manner, all of the objects in the 3D representation may be displayed and viewed without any need for scrolling the view in the horizontal and/or the vertical direction. A status of all of the objects may be displayed and viewed simultaneously without scrolling. On a large screen display such as at a large screen operations center, all of the objects may viewed simultaneously in the single view.

The systems and techniques also provide a shaped lens that is movable within the 3D representation in three axes. The shaped lens may be configured to display a subset of the objects and their associated attributes and/or metadata within the shaped lens. The subset of objects displayed within the shaped lens may be sized larger than the objects outside of the shaped lens. In this manner, each object may be examined in its full size and provide a display of its related attributes and metadata. The objects that are magnified within the shaped lens may show the relationships between the objects in a manner that allows a closer examination by a user. A degree of magnification may be configured by the user.

The shaped lens includes 3D shapes that define a space or an area into which objects may be viewed and magnified, along with one or more attributes. The 3D shapes may include geometric shapes such as, for example, a sphere, a cube, a pyramid, a cone, a cylinder or any other geometric shape. The 3D shapes also may include non-geometric shapes such as a 3D space or an area as defined and configured by the user.

The shaped lens may be configured to move in all three axes within the 3D representation. As the shaped lens is moved within the representation, objects having a same position in the representation as the shaped lens may be displayed in the shaped lens along with their associated attributes. In this manner, objects may move into and out of the shaped lens as the shaped lens is traversed throughout the 3D representation. The shaped lens may pass through the 3D representation in all three axes and may surround a set of objects that a user desires to examine.

In other aspects, the shaped lens may be configured to filter the objects that are displayed within the shaped lens. The shaped lens also may be configured to filter the type of information shown on the objects within the shaped lens. Other aspects associated with the display of the objects, the type of objects displayed, the status of the objects and their associated attributes may be configured both within the 3D representation and within the shaped lens.

In one exemplary implementation, objects that are external to the shaped lens may have other properties that differ from the properties of the objects internal to the shaped lens. For instance, objects that are external to the shaped lens may appear translucent compared to the objects within the shaped lens. The translucent objects may still retain other properties (e.g., color or shading) to indicate a status of the object. The translucent properties of the objects external to the shaped lens allow the user to focus their attention on the objects within the shaped lens and, at the same time, the user may view and maintain an overall picture of the 3D representation. The degree of translucency may be set by the user.

In other aspects, the size and/or the shape of the shaped lens is configurable. For example, a size of the shaped lens may be set (e.g., by default or by selection) and the size of the shaped lens may be changed on the fly or in real time as the shaped lens is being moved within the 3D representation. For instance, if the shaped lens is a sphere, the diameter of the sphere may be changed in real-time by the user. Also, for example, a shape of the shaped lens may be set to one shape and then may be changed on the fly or in real time as the shaped lens is being moved within the 3D representation. Also, both the 3D representation and the shaped lens may be rotated, either together or independent of each other. Furthermore, multiple shaped lenses may be used in the same 3D representation.

Figure 1:
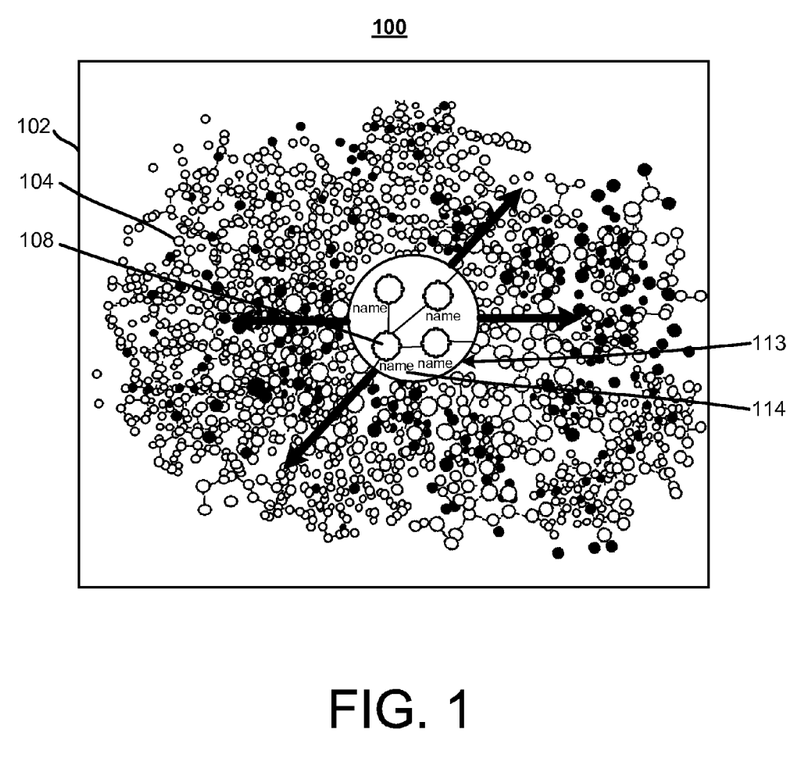
FIG. 1 is a schematic of an exemplary screen shot for a display of multiple objects in a three dimensional (3D) representation having a shaped lens.

Referring to FIG. 1, an exemplary schematic illustrates an exemplary screenshot 100 of a display of objects. The screenshot 100 includes a 3D representation 102 that includes a display of multiple objects 104 and 108. While the reference number 104 is pointing to one object, it may be used to refer in general to all of the objects in the 3D representation external to the shaped lens. Similarly, while the reference number 108 is pointing to one object, it may be used to refer in general to all of the objects in the 3D representation internal to or within the shaped lens. The objects displayed in the 3D representation 102 may be visual representations of real objects, as defined above. The underlying data related to the objects may be stored in one or more computing devices and displayed in the 3D representation 102.

In other exemplary implementations, the objects may represent a graph of a data model, where the data model may include multiple thousands of nodes. For example, the 3D representation 102 may be 3D graph model where the objects are arranged in a manner that indicates the relative relationship and importance among the objects. The 3D graph may appear as a molecular-type of structure that uses connections between the objects to identify relationships between the objects and that uses a size of the objects to indicate an importance of the object relative to the other objects (e.g., larger-sized objects may be more relatively more important than smaller-sized objects). This type of 3D graph model may be used, for example, to monitor service model relationships in an IT environment.

The objects 104 and 108 may be associated with attributes and/or metadata. Throughout this document, the terms metadata and attributes may be used interchangeably to mean the same thing. The attributes may include, for example, an object name, a status, a type of object, a predicted value, event information including an event count, an importance rating, an icon representation, a number of sub-objects, a number of tenants, an availability state, a performance state and any other type of attribute that may be associated with data in a database. The attributes may be selectable and configurable such that the objects displayed in the 3D representation 102 may indicate one or more of their attributes.

In one exemplary implementation, a status attribute for an object may be indicated through the use of one or more different colors and/or through the use of shading including the use of different gradations of shading. In this example of FIG. 1, shading may be used to indicate a status of the object. For instance, a shaded object may indicate one status and a non-shaded object may indicate a different status. Other indicators may be used to indicate a status attribute. The indicators may change as the status attribute changes such that the representation of the objects in the 3D representation dynamically changes based on real-time or near real-time changes in attributes. In this manner, a user who is monitoring the status of the network and the nodes in the network may determine a status of each of the monitored objects in a single glance. The objects are all viewable along with an indication of their status on a single page on a single screen.

In one exemplary implementation, the objects 104 and 108 may represent nodes in a computer network, such as an IT infrastructure, that are being monitored by a user or administrator of the network. The 3D representation 102 enables the user to view and monitor all of the nodes in the computer network without the need for scrolling to other viewpoints off of the screen. As can be seen from the screenshot 100, there is no horizontal scrollbar or vertical scrollbar present or required. Instead, all of the objects are viewable and displayed within the 3D representation 102.

Other attributes also may be displayed. For instance, a shape of the object may be used to indicate a particular attribute, where different shapes have different attribute meanings. A size of the object may be used to indicate a relative importance of the object as compared to other objects. For example, a hub or a parent node may include a larger-sized object and a slave or child node may include a smaller-sized object. The user who is monitoring the network may use the different shapes and/or sizes of the objects to identify different attributes for the objects.

In one exemplary implementation, the objects 104 in the 3D representation 102 may be sorted using one or more of the object attributes. For example, the objects may be sorted within the 3D representation 102 based on a status of the object. In this manner, all objects having one status may be grouped together in one section of the single pane and objects having a different status may be grouped together in another section of the 3D representation such as, for example, from right to left, from left to right, from top to bottom, from bottom to top, from back to front or from front to back within the 3D representation 102. The objects 104 may be sorted in this manner and still maintain their relationships relative to other objects. The sort criteria may include primary and secondary criteria.

In other examples, the objects 104 may be sorted based on a name of the object or a type of the object. For example, if the objects represent nodes in a computer network, where the nodes include different types of network components, the objects may be sorted within the 3D representation based on the type of network component.

In other examples, the objects may be sorted based on a geographic location attribute of the object. For example, if the objects represent nodes in a computer network, the objects may be sorted based on a geographic location of the particular network component. For instance, nodes located on the west coast of the United States may be sorted such that they are displayed to the left of the display in the 3D representation 102. Nodes of the computer network that are located in the Midwest of the United States may be displayed in the middle of the 3D representation 102. Nodes that are located on the east coast of the United States may be displayed on the right side of the 3D representation 102. In this manner, a user who is monitoring a status of the computer network represented by the objects may determine if a problem exists in a particular location by looking at a status indicator of the objects in relation to the geographic location of the particular node. The 3D representation view of all of the objects enables a user to determine, at a glance, if there is a pattern or other indicated failure related to the objects based on a sorted geographic location attribute.

In another exemplary implementation, the objects displayed in the 3D representation 102 may be filtered such that only objects having certain attributes are displayed. For example, if the objects represent nodes in a computer network, then a user may select to filter the objects based on a type of network component represented by each object. In this manner, the user may choose to display, for example, only the server components in the network. Alternatively, the monitor may display a combination of only the routers and switches in the network and no other components. Any combination of one or more attributes may be used to filter the objects such that only selected objects meeting the filter criteria are displayed within the 3D representation 102. Furthermore, as discussed above, the filtered objects also may be sorted based on one or more attributes as selected by a user.

In another exemplary implementation, the objects that do not meet the selected filter criteria may still be displayed within the 3D representation 102 but in a different state. For example, the objects that do not meet the selected filter criteria may still be displayed within the 3D representation 102 but in a translucent state. In this manner, a user may focus on the objects that meet the filter criteria and, at the same time, still maintain an overall picture of the 3D representation.

In one exemplary implementation, the objects 104 are dynamically sized and spaced relative to one another such that all of the objects fit within the 3D representation 102. The size and spacing of each object may be dependent on a total number of objects within the 3D representation 102 such that all of the objects are viewable without the need for scrolling. For example, a total number of objects in the dataset that are to be represented in the 3D representation may be calculated and that number may be used to determine the sizing and spacing of each object. Fewer objects in the dataset may allow for a larger representation of the objects. Datasets with a large number of objects may allow for the majority of objects to be displayed in one size and some of the objects to be displayed in a different size.

As illustrated in the screenshot 100, the objects 104 are depicted in various sizes and spacing in relation to one another. In some exemplary implementations, the configuration of the sizing and spacing of the objects may be configurable. In this manner, minimum and maximum sizes of objects may be set by a user. The number of objects in a particular dataset may determine a minimum and a maximum size for the objects based on the number of objects within the particular dataset. Thus, each dataset may have different minimum and maximum sizes because the number of objects may vary from one dataset to another dataset.

The 3D representation 102 also may include a shaped lens 113, where the shaped lens 113 is movable within the 3D representation 102 in all three axes. The shaped lens 113 may display a subset of the objects and their associated metadata within the shaped lens 113. For example, in the screenshot 100, the shaped lens 113 displays a subset of the objects 108 within the shaped lens 113. The objects 108 within the shaped lens 113 may be displayed in full size and also may include one or more attributes associated with the objects. For example, the objects 108 may include an icon and name attribute 114 such that the user may view the displayed attributes in full size. The objects 108 may be represented as objects that are larger than the objects outside of the shaped lens 113. The shaped lens 113 may display the objects within the lens as magnified when compared with objects outside of the shaped lens 113. In this manner, a user who is viewing and monitoring the status of the objects may see additional detail and information about the objects within the shaped lens 113 as compared to objects outside of the lens 113.

In the example of FIG. 1, the shaped lens 113 may be a 3D sphere, like a hollow ball. As discussed below with respect to FIG. 4, the shaped lens also may be other 3D shapes.

The objects 108 within the shaped lens 113 may maintain and display their relationships relative to other objects within the shaped lens 113. The relationships may be illustrated through the use of connectors between the objects.

While the objects both inside the 3D representation 102 and the shaped lens 113 are represented as dots or circles, other shapes and sizes may be used to represent the objects within the 3D representation 102 and the shaped lens 113. For example, the objects may be represented by other symbols or identifiers or shapes that may change throughout the 3D representation 102 and within the shaped lens 113. Additionally, other connector types or other identifiers may be used to indicate the relationship between the objects.

In one exemplary implementation, the size of the objects that enter the shaped lens 113 may be configurable. In this manner, the user may select a level of magnification for the objects that are displayed in the shaped lens 113. The level of magnification or size of the objects within the shaped lens may be changed in real time by the user.

In one exemplary implementation, the attributes that are displayed within the shaped lens 113 may be configurable. In this manner, a user may select the attributes to display within the shaped lens 113 for each object 108 that appears within the shaped lens. In this example, the attributes include a status of the object as indicated by the shading of the object, a name of the object, and an icon representing a type of the object. Many other types of attributes may be included and displayed for each object within the shaped lens 113. Attributes may be selected and/or deselected such that different combinations of attributes may be displayed for each object 108 within the shaped lens 113.

The shaped lens 113 is moveable within the 3D representation 102. In this manner, a user may move the shaped lens 113 anywhere within the 3D representation 102. The shaped lens 113 may be moved in any direction in any of the axes. Since the shaped lens 113 may be moved in any direction in the 3D representation 102, it may be moved deep into the 3D representation along the z-axis. In this manner, the user may use the shaped lens 113 to view objects and their associated attributes deep in the 3D representation that otherwise might be obscured by objects that are closer on the z-axis. The user may use any input device such as, for example, a mouse, a track pad, a pointer, a joy stick, a video game-type controller or other input device including a touch screen to grab and drag the shaped lens 113 within the 3D representation 102.

As the shaped lens 113 is moved within the 3D representation 102, objects having a same 3D coordinate position as the area defined by the shaped lens 113 may be displayed within the shaped lens 113 along with one or more of their associated attributes. In this manner, objects may move into and out of the shaped lens 113 as the shaped lens 113 moves throughout the 3D representation. The shaped lens 113 may surround a set of objects that a user desires to examine. Once it is determined which objects occupy the same coordinate position as the area defined by the shaped lens, any filter criteria may be applied to determine which objects and attributes may be displayed within the shaped lens 113.

The ability to move the shape lens 113 enables a monitor of the objects to move the shaped lens 113 to an area of interest within the 3D representation in order to gain a more magnified view of particular objects, their associated attributes and their relationship to other objects. For example, if the objects represent a computer network and a monitor is viewing the single screen to monitor a status of the computer network as indicated by a color or shading of the objects, then the user may move the shaped lens 113 to get more detailed information on any object within the 3D representation 102. A user may simply drag the shaped lens 113 over the objects of interest in order to see more detailed information related to the object.

Figure 2:
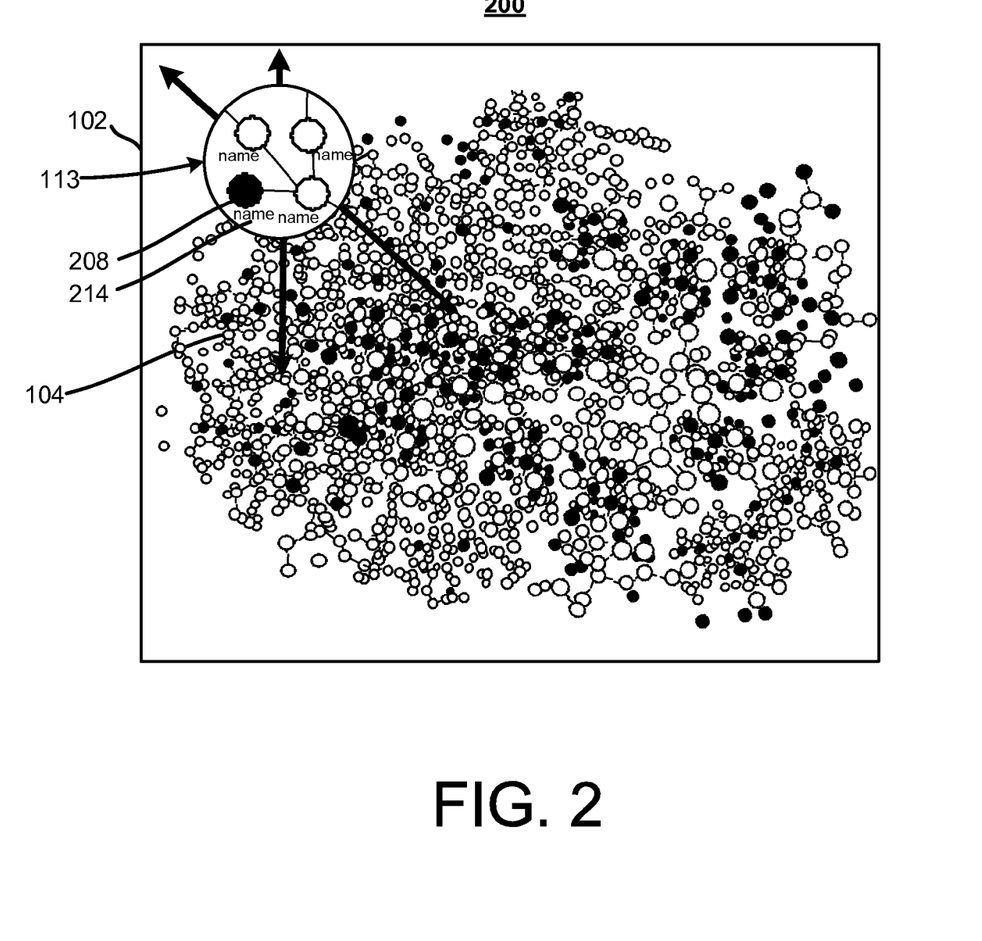
FIG. 2 is a schematic of an exemplary screen shot for a display of multiple objects in a 3D representation having a shaped lens.

Referring to FIG. 2, an exemplary schematic of a screenshot 200 illustrates the 3D representation 102 of FIG. 1, where the shaped lens 113 has been moved to a different area of the 3D representation. In this example, the user has moved the shaped lens 113 to examine object 208 in more detail within the shaped lens 113. For example, the shading of object 208 may indicate a "trouble" status. The user may notice the shaded object 208 and desire to view a larger representation of the object and to show one or more attributes 214 related to the object. The shaped lens 113 may be traversed through the 3D representation in the appropriate axes until the desired object is captured or appears within the shaped lens 113. The shaped lens 113 is moved until the coordinate position of the object 208 is within the coordinates defined by the area of the shaped lens 113.

Both the shaped lens 113 and the 3D representation 102 may be configured to be rotatable by the user. The shaped lens 113 and the 3D representation 102 may be rotated together or may be rotated independent of one another.

Referring back to FIG. 1, as the shaped lens 113 is moved, objects will enter and exit the shaped lens 113. As the objects approach the moving shaped lens 113, their gradation of translucency may change such that the objects become less translucent. The gradation of the translucency or permeability factor may be configured by the user. When objects enter the shaped lens 113, a non-translucent and a full size and/or the largest possible size of the object may be displayed along with a maximum number of attributes associated with the objects in the shaped lens 113. As objects exit the shaped lens 113, they may decrease in size and gradually continue to decrease in size as they move further away from the shaped lens 113. As objects exist the shaped lens 113, they may become translucent and become more translucent as they move further away from the shaped lens 113.

In one exemplary implementation, the size of the shaped lens 113 may be configurable. Initially, a size may be set (e.g., by default or by selection). The size of the shaped lens 113 may be changed on the fly or in real time when the shaped lens 113 is either stationary or being moved within the 3D representation 102.

For example, if the shaped lens 113 is a sphere, the diameter of the sphere may be changed in real time by the user. The user may use an input device such as a wheel on a mouse to change the size of the sphere. In this manner, a larger sphere may be used to show more objects and/or attributes within the sphere, as desired by the user.

In one exemplary implementation, the shaped lens 113 may be configured to filter the objects that appear within the shaped lens 113. For example, a user may use selectable criteria to determine which objects are to appear within the shaped lens 113. In this manner, a user may focus on desired objects as the shaped lens 113 is either stationary within the 3D representation 102 or as it is moved within the 3D representation 102. As the shaped lens 113 is moved within the 3D representation 102, only objects meeting the filter criteria will be displayed within the shaped lens 113 along with their associated attributes.

In one exemplary implementation, the objects may represent nodes in a computer network. A user may set a filter to show only objects with a particular status within the shaped lens 113. For instance, a filter may be set to display only objects having a trouble status, such as a shaded indicator, to display within the shaped lens 113. In this manner, a user may focus on the desired troubled objects and move the shaped lens to desired locations within the single pane and obtain a full size view and detail of attributes associated with the objects meeting the selected filter criteria. Other attributes may be used as filter criteria to determine which objects may appear in the shaped lens 113.

Figure 3:
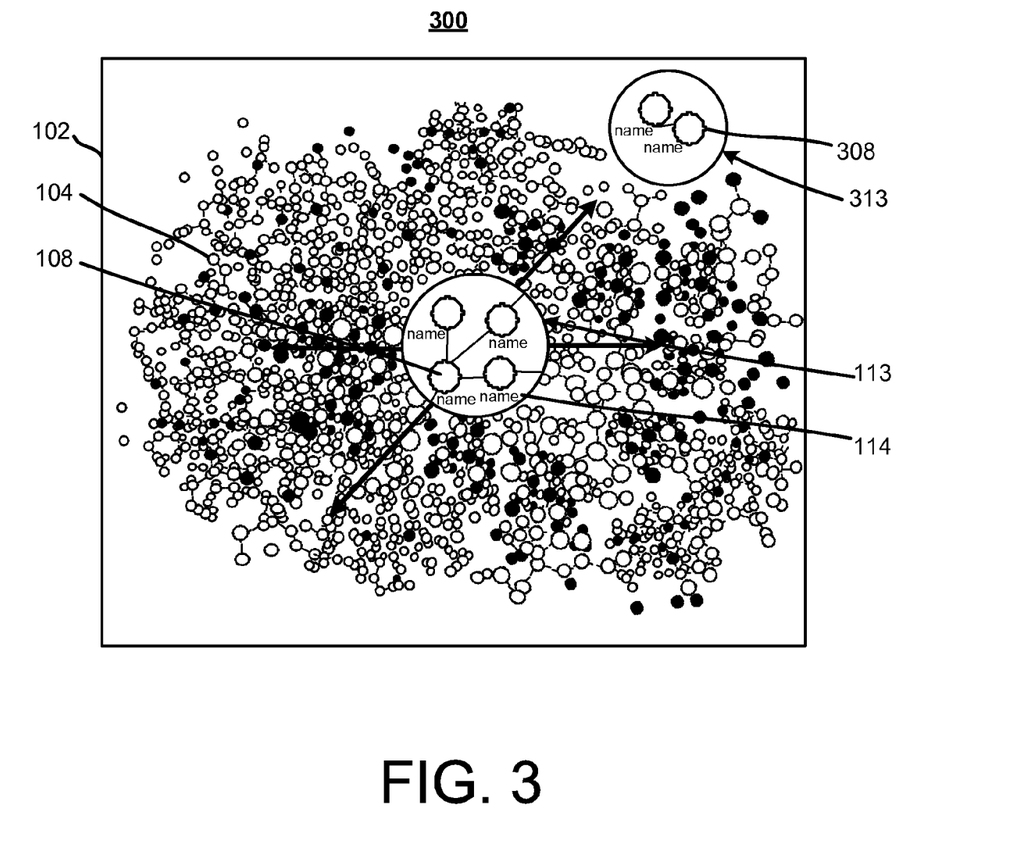
FIG. 3 is a schematic of an exemplary screen shot for a display of multiple objects in a 3D representation having multiple shaped lenses.

In one exemplary implementation, multiple shaped lenses may be generated, configured and used within a 3D representation. Referring to FIG. 3, an exemplary screen shot 300 illustrates the 3D representation 102 having two shaped lenses 113 and 313. In this example, a second shaped lens 313, having a different size than the shaped lens 113, is used in the 3D representation to magnify and/or to filter objects that appear within the shaped lens 313. The shaped lens 313 includes all of the features and functionality of the shaped lens 113, as described above with respect to FIGS. 1 and 2. The features (e.g., filters set, size of objects within the lens, shape of the lens, etc.) for the shaped lens 313 may be configured independent features for the shaped lens 113. In this manner, the user may use multiple lenses to focus on different areas or aspects of the 3D representation. While only two shaped lenses are illustrated, additional shaped lenses also may be generated, configured and used in the 3D representation.

In this example, the shaped lens 313 has been moved to examine the object 308 and its associated attributes in more detail. The shaped lens 313 may be left in place over time to monitor the same captured object 308.

Figure 4:
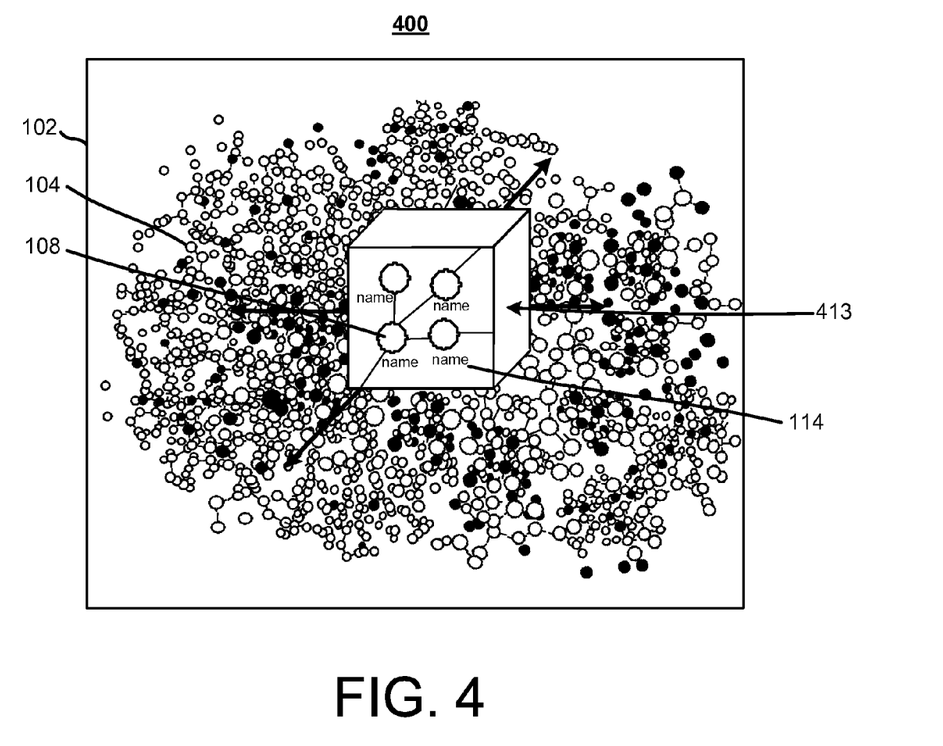
FIG. 4 is a schematic of an exemplary screen shot for a display of multiple objects in a 3D representation having a shaped lens.

In one exemplary implementation, the shaped lens may be configured to different shapes. For instance, the shaped lenses 113 and 313 of FIGS. 1-3 illustrate a sphere-shaped lens. Referring to FIG. 4, an exemplary schematic of a screen shot 400 illustrates a cube-shaped lens 413 in the 3D representation 102. In this example, the shape of the lens 113 of FIGS. 1-3 has been changed to a cube-shaped lens 413. In this manner, the user may change the shape of the shaped lens as desired to best examine the objects, their relationship to other objects and their attributes.

Different shaped lenses may lend themselves to better examine different objects having different structures and different relationships to other objects. A cone-shaped or pyramid-shaped lens may be better for examining objects in a hierarchical relationship. For example, the shape of the shaped lens may be any type of geometric shape or non-geometric shape. The shape may be set initially by default or by selection. Also, the shape may be changed on the fly in real time by the user. In one exemplary implementation, a user may configure a unique shaped lens that is defined by coordinates as selected by the user. In another exemplary implementation, a user may use a drawing tool to configure a unique shaped lens. Any shape drawn by the user may be translated into coordinates that define an area for the shaped lens. When objects enter the area of the shaped lens defined by the coordinates, then any magnification level and any other filter criteria may be applied to the objects for display within the shaped lens.

Figure 5:
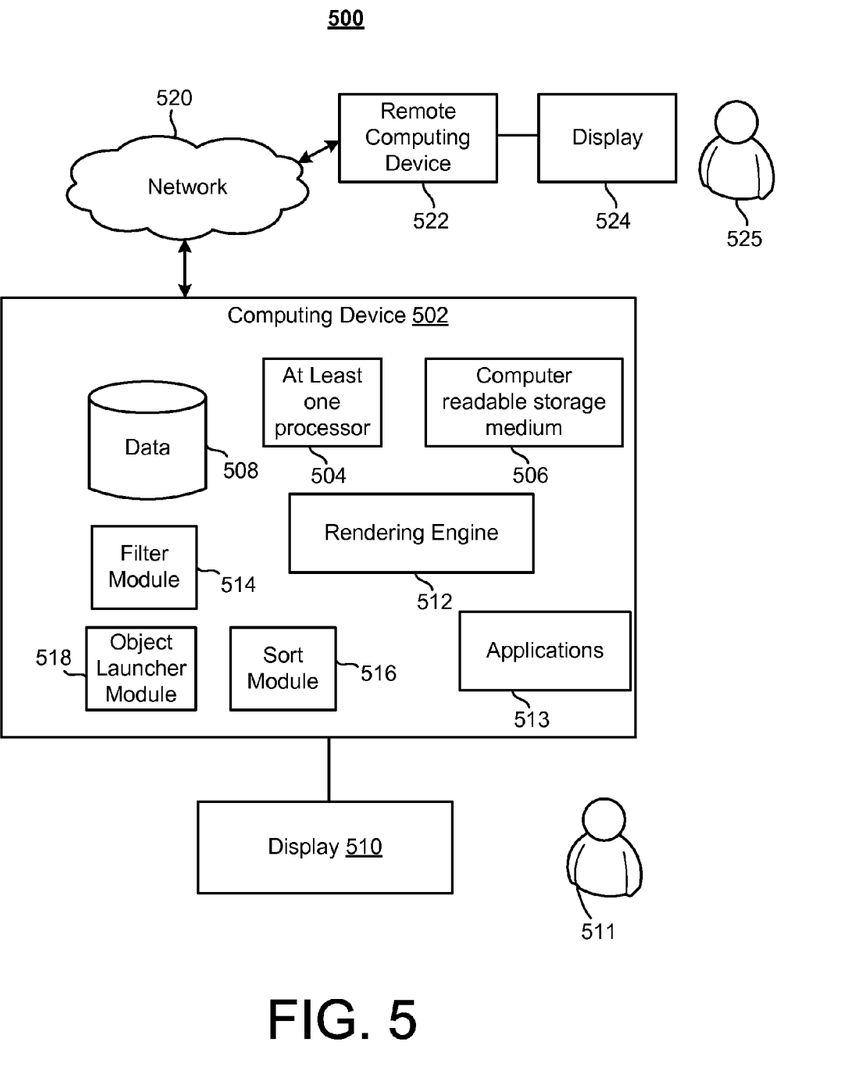
FIG. 5 is an exemplary block diagram of a system for displaying, viewing and navigating multiple objects in a 3D representation.

Referring to FIG. 5, an exemplary block diagram of a system 500 is illustrated. The system 500 may include a computing device 502. The computing device 502 may generally represent virtually any computing device, which may be configured to process instructions and to communicate with other devices. For example, the computing device 502 may include a server, any standard desktop or personal computing device, any laptop, notebook, or netbook computer, any tablet computer, or any Smartphone or other mobile computing device. Such computing devices, and other computing devices, may be configured to access other devices through the network 520 in any conventional manner. For example, many computing devices 502 may include various types of network-related hardware/software which enable the computing device 502 to communicate over the public internet, private intranet, or other network, to thereby access other devices.

The computing device 502 may be operably connected to display 510. The display 510 may be understood to represent virtually any type of display, for example, a monitor, a touch screen monitor, or any other type of visual or auditory display. In this example, the display 510 may be the device on which the screenshots 100 of FIG. 1, 200 of FIG. 2, 300 of FIG. 3 and 400 of FIG. 4 may be rendered.

The computing device 502 may include at least one processor 504, a computer-readable storage medium 506 and data 508. That is, for example, the computing device 502 may rely on at least one processor 504 and also may rely on two or more processors executing in parallel to achieve a desired result. The processor 504 may be configured to execute instructions that are stored on the computer-related storage medium 506 and to cause the processor to perform certain actions and/or functions. Meanwhile, the computer-readable storage medium 506 may represent any conventional type of computer memory which may be used, for example, to store instructions which, when executed by the at least one processor 504, cause other components within the computer device 502 to perform various functions, and other relevant functions described herein.

The data 508 may be any type of data store or database that is configured to store and maintain data, including data needed to render a 3D representation. The data may be in any type of database. The data may be arranged in any type of order and include various types of relationships among the data. For example, the data may be arranged in a hierarchical structure and include data that are in different layers of the hierarchy such as in a tree-structure. As discussed above, the data 508 may relate to real objects including, without limitation, physical objects and logical or virtual objects.

The data 508 also may include one or more attributes and/or metadata that is associated with the data. The attributes may be stored in conjunction with the data. The attributes may be selectable such that one or more of the attributes may be displayed on the display 510 in the 3D representation or one of the shaped lenses, as discussed above.

The computing device 502 also includes a rendering engine 512. The rendering engine 512 may be configured to operate in conjunction with the at least one processor 504 and the computer-readable storage medium 506 to process and render visual representations of the data 508 on the display 510. The rendering engine 512 may be configured to cause the processor 504 to display multiple objects in a 3D representation, where the multiple objects are visual representations of the data 508. For example, the rendering engine 512 may cause the at least one processor 504 to render visual representations of the objects such as the objects 104 and 108 of FIG. 1 on a display 510. The rendering engine 512 may dynamically size and space the objects relative to one another to fit all of the objects in a single 3D representation, such as the 3D representation 102 of FIG. 1.

The rendering engine 512 also may be configured to display a subset of the objects and associated metadata in an shaped lens, such as the shaped lenses 113 of FIGS. 1-4, 313 of FIG. 3 and 413 of FIG. 4. The rendering engine 512 may size the shaped lens to fit within a 3D representation and may dynamically change the size and spacing of objects within the 3D representation relative to their position with respect to the shaped lens. The rendering engine 512 may use animation technology or other types of technologies to dynamically change the size and spacing of the objects in the 3D representation in relation to a shaped lens.

The rendering engine 512 also may be configured to respond to inputs from a user 511 to move the shaped lens within the 3D representation. The rendering engine 512 also may be configured to change the size and spacing of the objects within the shaped lens as the shaped lens is being moved. The rendering engine 512 may be configured to display the objects within the shaped lens as they enter and exit the lens. In one exemplary implementation, the objects displayed within the shaped lens may be sized larger than the objects outside of the shaped lens. In this manner, the objects displayed within the shaped lens may be rendered in their full size or to a configurable magnification level and also may be displayed in conjunction with any selected attributes. Thus, the rendering engine 512 magnifies the object within the shaped lens relative to other objects outside of the shaped lens.

The rendering engine 512 may use coordinate position data to determine which objects from the 3D representation have entered the shaped lens. For example, the rendering engine 512 may use the known position of objects in the 3D representation and the position of the shaped lens to determine when an object should be rendered in the shaped lens.

The computing device 502 also may include one or more applications 513. The applications 513 may include applications that work in conjunction with the rendering engine 512, the processor 504, the computer-readable storage medium 506 and the data 508 to render the objects in the 3D representation and the shaped lenses on the display 510. In one exemplary implementation, the applications 513 may include a browser application that is used by a user 511 to assist in the display of the data. The applications 513 also may include one or more database manipulation programs that enable a user to configure, change, modify or update the data stored in the database 508.

The computing device 502 also may include a filter module 514, a sort module 516 and an object launcher module 518. The filter module 514 may be used to configure and set filter selection criteria to determine which objects may be displayed in the 3D representation and/or in the shaped lenses. For example, the filter module 514 may be used to select certain criteria or attributes related to the data such that only objects meeting that criteria are displayed within the 3D representation. Additionally, the filter module 514 may be used to select criteria to determine which objects meeting the selected criteria will be displayed within the shaped lens. The filter module 514 is configurable and may enable the user 511 to select one or more attributes in order to filter the objects that are displayed on the display 510.

The sort module 516 may be configured to enable a user to select the sort criteria on which to order the objects within the 3D representation and/or the shaped lens. As discussed above with respect to FIG. 1, the objects within a 3D representation may be sorted based on one or more selected attributes. The sort module 516 may enable the user 511 to select one or more of the attributes in which to sort the display of the objects on the display 510.

The object launcher module 518 may be configured to enable a user to select one or more objects and to perform additional actions related to the selected objects. For example, the object launcher module 518 may be configured to enable a user to select, for example, by a right click of a mouse, an object within a shaped lens and to perform other actions related to the selected object including launching the selected object in another window or other display page on the display 510. The object launcher module 518 also may be used to allow selection of an object to display additional information including all attribute information related to the selected object. The object launcher module 518 may be configured to allow for selection of multiple objects at the same time in order to compare information related to one or more of the objects or to view information about the selected objects simultaneously in a same or different screen.

In one exemplary implementation, a remote computing device 522 may connect to the computing device 502 through a network 520. The remote computing device 522 may be any type of computing device such as those described above with respect to the computing device 502. The remote computing device 522 may enable a user 525 to view the data 508 as rendered by the rendering engine 512 on a display 524 connected to the remote computing device 522. In this manner, a remote computing device and display 524 may remotely connect to the computing device 502 through the network 520 in order to have the rendering engine 512 display the objects within the 3D representation and/or shaped lenses on the remote computing device 522 instead of or in addition to being displayed on the display 510 connected to the computing device 502. The remote computing device 522 may access the data and the functionality of the rendering engine 512 using one or more applications including, for example, a browser application to access the rendered data over the network 520 such that the information including the objects is displayed on the display 524 for viewing and manipulation by the user 525.

Figure 6:
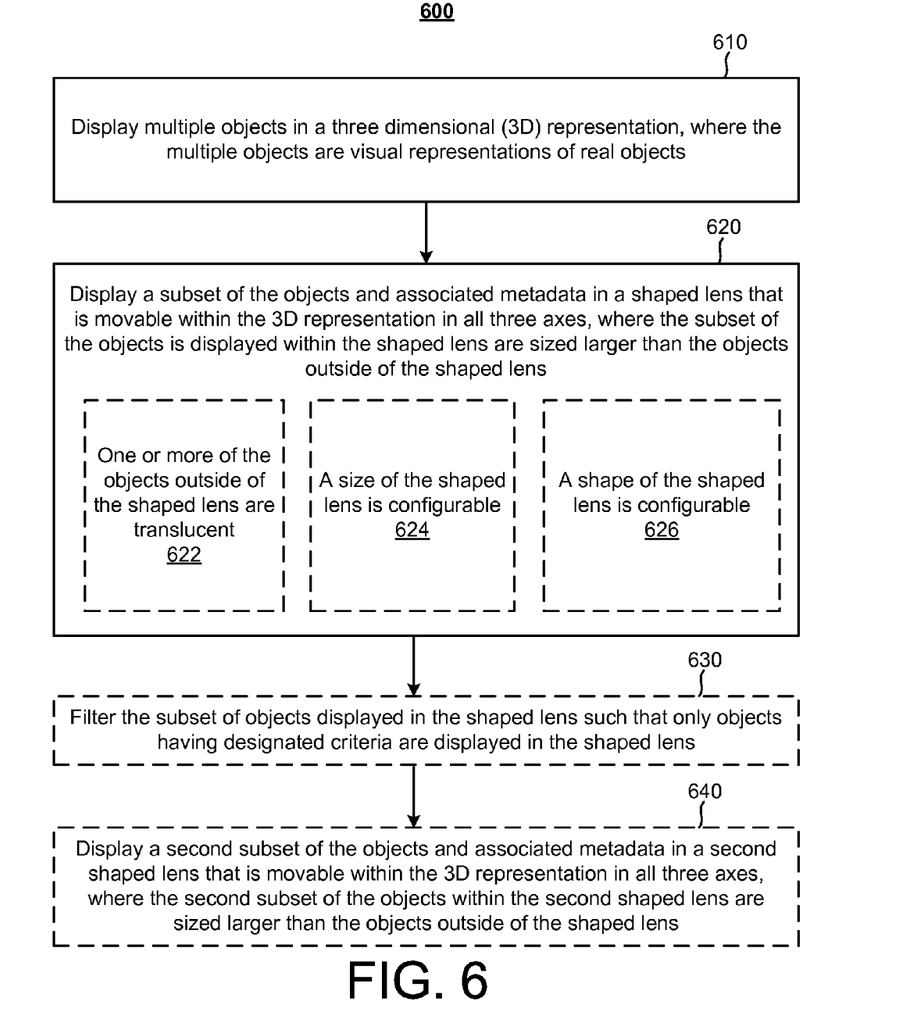
FIG. 6 is a flowchart illustrating example operations of the system of FIG. 5.

Referring to FIG. 6, an exemplary flow diagram illustrates a process 600 related to the systems described above. Process 600 includes displaying multiple objects in a three dimensional (3D) representation, where the multiple objects are visual representations of real objects (610). For example, as discussed above with respect to FIGS. 1-5, the rendering engine 512 may be configured to display multiple objects in a 3D representation such as the 3D representation 102 of FIGS. 1-4. The multiple objects such as objects 104 and 108 of FIG. 1 are visual representations of data stored, for example, in database 508 of FIG. 5. As discussed above, the objects may be dynamically sized and spaced using the rendering engine 512 relative to one another to fit all of the objects in the 3D representation.

In one exemplary implementation, the 3D representation may be a 3D graph model. The objects may represent nodes in an IT infrastructure. In another exemplary implementation, the 3D representation may be a 3D physical map of a location and the objects may be landmarks (e.g., buildings connected by streets, parks, bodies of water, etc.). In another exemplary implementation, the 3D representation may be a chemical or biological structure and the objects may be chemical elements or biological elements, respectively.

Process 600 also includes displaying a subset of the objects and associated metadata in a shaped lens that is movable within the 3D representation, in all three axes, where the subset of the objects is displayed within the shaped lens are sized larger than the objects outside of the shaped lens (620). For example, the rendering engine 512 may be configured to render an a shaped lens, such as shaped lens 113 of FIG. 1 that is designed to display a subset of the objects within the shaped lens. In this manner, the shaped lens may be used to focus on particular objects within the 3D representation and to display them in a larger size such that more detail related to the object within the shaped lens, including one or more selected attributes, is more readily visible to the user. A user-configurable magnification factor may be used to set a degree of magnification of the objects within the shaped lens.

The shaped lens 113 of FIG. 1 may be moved throughout the 3D representation in any direction. The shaped lens 113 and the 3D representation may both rotated, either together or independent of each other, as discussed above. As the shaped lens moves in the 3D representation, the location coordinates of the shaped lens and the location coordinates of the objects are used to determine which objects move into and out of the shaped lens.

In one exemplary implementation, one or more objects outside of the shaped lens are translucent (622). For example, the objects 104 that are external to the shaped lens 113 of FIG. 1 may be made translucent such the user may focus more attention on objects within the shaped lens 113 and at the same time still maintain an overall view of the 3D representation. A user-configurable permeability factor may be used to set a degree of translucency.

In another exemplary implementation, a size of the shaped lens may be configurable (624). For example, a user may select a size of the shaped lens 113 of FIG. 1 and may change the size of the shaped lens 113 in real time.

In another exemplary implementation, a shape of the shaped lens is configurable (626). As discussed above and illustrated in FIGS. 1-3, the shaped lens 113 may be a spherical shape. In this manner, the shaped lens may resemble a hollow, crystal ball-like structure that surrounds or captures objects as the shaped lens is moved over a position occupied by the object in the 3D representation. As illustrated in FIG. 4, the shaped lens 413 may be a cube that includes all of the same features and functions of the shaped lens 113. The shape of the shaped lens may be configured to be changed by the user in real time within the 3D representation. In this manner, the user may change the shape of the shaped lens as desired, for example, to better examine object status and relationships in a shape conducive for the particular objects. The shaped lens may be any geometric shape or other shape including, without limitation, a cone, a pyramid, or any other shape.

In another exemplary implementation, the process 600 may include filtering the subset of objects in the shaped lens such that only objects having designated criteria are displayed in the shaped lens (630). For example, the filter module 514 may be used to select criteria to determine which objects may be displayed within the shaped lens.

In another exemplary implementation, the process 600 may include displaying a second subset of the objects and associated metadata in a second shaped lens that is movable within the 3D representation in all three axes, where the second subset of the objects within the second shaped lens are sized larger than the objects outside of the shaped lens (640). For example, as illustrated in FIG. 3, two shaped lenses 113 and 313 may be generated and moved within the 3D representation 102. The shaped lens 113 and 313 may be different sizes and/or different shapes independent of each other. Each of the shaped lenses 113 and 313 may have different filter criteria set such that different types of objects may be displayed in each of the lenses based on the different filter criteria. More than two shaped lenses may be generated and used in a 3D representation.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable medium and including executable code that, when executed, is configured to cause a data processing apparatus to:
    display multiple objects in a three dimensional (3D) representation that uses one or more connections between the multiple objects to identify relationships between the multiple objects and that uses different sizes of the multiple objects to indicate a relative importance of the multiple objects, wherein the multiple objects are visual representations of real objects and the multiple objects include one or more attributes;
    sort the multiple objects within the 3D representation using one or more of the attributes; and
    display a subset of the objects and associated metadata in a shaped lens that is movable within the 3D representation in all three axes, wherein the subset of the objects displayed within the shaped lens are sized larger than the objects outside of the shaped lens and the subset of the objects displayed within the shaped lens include a magnified display of one or more of the attributes compared to one or more of the attributes of the objects outside of the shaped lens.

2. The computer program product of claim 1 wherein one or more of the objects outside of the shaped lens are translucent.

3. The computer program product of claim 1 wherein a size of the shaped lens is configurable.

4. The computer program product of claim 1 wherein a shape of the shaped lens is configurable.

5. The computer program product of claim 1 wherein:
    the 3D representation includes a 3D graph model; and
    the shaped lens is a spherical-shaped lens that is movable and rotatable within the 3D graph model.

6. The computer program product of claim 1 further comprising executable code that, when executed, is configured to cause the data processing apparatus to filter the subset of objects displayed in the shaped lens such that only objects having designated criteria are displayed in the shaped lens.

7. The computer program product of claim 1 further comprising executable code that, when executed, is configured to cause the data processing apparatus to display a second subset of the objects and associated metadata in a second shaped lens that is movable within the 3D representation in all three axes, wherein the second subset of the objects displayed within the second shaped lens are sized larger than the objects outside of the shaped lens.

8. A computer-implemented method executing instructions stored on a non-transitory computer-readable medium, the method comprising:
    displaying, using at least one processor, multiple objects in a three dimensional (3D) representation that uses one or more connections between the multiple objects to identify relationships between the multiple objects and that uses different sizes of the multiple objects to indicate a relative importance of the multiple objects, wherein the multiple objects are visual representations of real objects and the multiple objects include one or more attributes;
    sorting, using the at least one processor, the multiple objects within the 3D representation using one or more of the attributes; and
    displaying, using the least one processor, a subset of the objects and associated metadata in a shaped lens that is movable within the 3D representation in all three axes, wherein the subset of the objects displayed within the shaped lens are sized larger than the objects outside of the shaped lens and the subset of the objects displayed within the shaped lens include a magnified display of one or more of the attributes compared to one or more of the attributes of the objects outside of the shaped lens.

9. The computer-implemented method of claim 8 wherein one or more of the objects outside of the shaped lens are translucent.

10. The computer-implemented method of claim 8 wherein a size of the shaped lens is configurable.

11. The computer-implemented method of claim 8 wherein a shape of the shaped lens is configurable.

12. The computer-implemented method of claim 8 wherein:
    the 3D representation includes a 3D graph model; and
    the shaped lens is a spherical-shaped lens that is movable and rotatable within the 3D graph model.

13. The computer-implemented method of claim 8 further comprising filtering, using the at least one processor, the subset of objects displayed in the shaped lens such that only objects having designated criteria are displayed in the shaped lens.

14. The computer-implemented method of claim 8 further comprising displaying, using the at least one processor, a second subset of the objects and associated metadata in a second shaped lens that is movable within the 3D representation in all three axes, wherein the second subset of the objects displayed within the second shaped lens are sized larger than the objects outside of the shaped lens.

15. An apparatus including instructions stored on a non-transitory computer-readable storage medium and executable by at least one processor, the apparatus comprising:
    a rendering engine configured to cause the at least one processor to:
        display multiple objects in a three dimensional (3D) representation that uses one or more connections between the multiple objects to identify relationships between the multiple objects and that uses different sizes of the multiple objects to indicate a relative importance of the multiple objects, wherein the multiple objects are visual representations of real objects and the multiple objects include one or more attributes;
        sort the multiple objects within the 3D representation using one or more of the attributes; and
        display a subset of the objects and associated metadata in a shaped lens that is movable within the 3D representation in all three axes, wherein the subset of the objects displayed within the shaped lens are sized larger than the objects outside of the shaped lens and the subset of the objects displayed within the shaped lens include a magnified display of one or more of the attributes compared to one or more of the attributes of the objects outside of the shaped lens.

16. The apparatus of claim 15 wherein one or more of the objects outside of the shaped lens are translucent.

17. The apparatus of claim 15 wherein a size of the shaped lens is configurable.

18. The apparatus of claim 15 wherein a shape of the shaped lens is configurable.

19. The apparatus of claim 15 wherein:
    the 3D representation includes a 3D graph model; and
    the shaped lens is a spherical-shaped lens that is movable and rotatable within the 3D graph model.

20. The apparatus of claim 15 wherein the rendering engine is configured to cause the at least one processor to filter the subset of objects displayed in the shaped lens such that only objects having designated criteria are displayed in the shaped lens.

21. The apparatus of claim 15 wherein the rendering engine is configured to cause the at least one processor to display a second subset of the objects and associated metadata in a second shaped lens that is movable within the 3D representation in all three axes, wherein the second subset of the objects displayed within the second shaped lens are sized larger than the objects outside of the shaped lens.

* * * * *

UNITED STATES PATENT AND TRADEMARK OFFICE
CERTIFICATE OF CORRECTION

| | | |
|---|---|---|
| PATENT NO. | : 8,610,743 B2 | Page 1 of 1 |
| APPLICATION NO. | : 13/174358 | |
| DATED | : December 17, 2013 | |
| INVENTOR(S) | : Ricky Poston et al. | |

It is certified that error appears in the above-identified patent and that said Letters Patent is hereby corrected as shown below:

In the Claims

In column 15, line 62, in claim 8, before "least" insert -- at --.

Signed and Sealed this
Twenty-fifth Day of March, 2014

Michelle K. Lee
*Deputy Director of the United States Patent and Trademark Office*